United States Patent [19]
Glinski et al.

[11] Patent Number: 5,201,796
[45] Date of Patent: Apr. 13, 1993

[54] GAS TURBINE ENGINE ARRANGEMENT

[75] Inventors: Robert L. Glinski, Wellington; Gary M. Perkins, Palm Beach Gardens, both of Fla.

[73] Assignee: United Technologies Corporation, Hartford, Conn.

[21] Appl. No.: 775,865

[22] Filed: Oct. 15, 1991

[51] Int. Cl.[5] .............................. F02C 3/06; F02C 7/06
[52] U.S. Cl. ................................. 60/39.161; 60/39.31
[58] Field of Search ................ 60/39.04, 39.15, 39.16, 60/39.17, 39.31

[56] References Cited
U.S. PATENT DOCUMENTS

| | | | |
|---|---|---|---|
| 2,704,434 | 3/1955 | Schmitt | 60/37.161 |
| 4,147,024 | 4/1979 | Moellmann | 60/39.15 |
| 4,829,763 | 5/1989 | Rao | 60/30.05 |
| 4,893,466 | 1/1990 | Egnell et al. | 60/39.161 |

FOREIGN PATENT DOCUMENTS

973589  2/1951  France ........................... 60/39.281

OTHER PUBLICATIONS

Shepherd, D. G. *Introduction to the Gas Turbine* Constable & Company, London, 1960, pp. 56–57.

*Primary Examiner*—Louis J. Casaregola
*Attorney, Agent, or Firm*—Edward L. Kochey, Jr.

[57] ABSTRACT

A separate low pressure shaft and a high pressure shaft are axially aligned. The low pressure shaft is at one end and carries the low pressure compressor and the low pressure turbine, and is connected to the electric generator. The high pressure shaft carries the high pressure compressor and the high pressure turbine. Only three bearing housings are required. Parts of the casing are horizontally split to simplify maintenance.

2 Claims, 3 Drawing Sheets

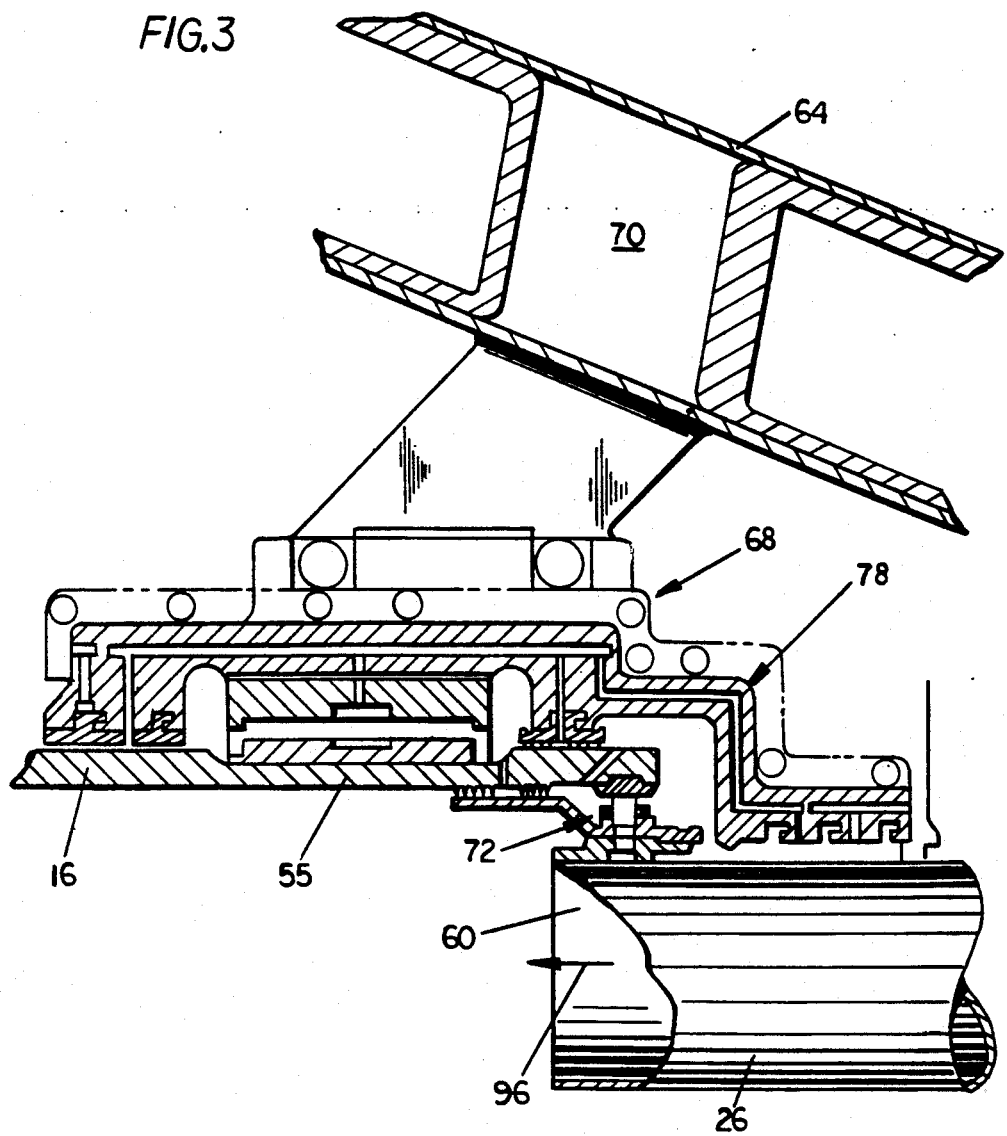

GAS TURBINE ENGINE ARRANGEMENT

TECHNICAL FIELD

The invention relates to gas turbine engines and in particular to an arrangement of compressor and turbine sections for use in a humid air turbine cycle.

BACKGROUND

In gas turbine engines it is conventional to arrange the various components from one end in the order of low pressure compressor, high pressure compressor, high pressure turbine and low pressure turbine. Often, the low pressure compressor and low pressure turbine rotors are mounted on a low pressure shaft, with an electric generator secured to that shaft. The high pressure compressor rotor and high pressure turbine rotor are secured to a high pressure shaft.

The high pressure shaft has a hollow bore with the low pressure shaft passing concentrically therethrough. The diameter of the low pressure shaft is therefore limited by the requirement that it pass through the high pressure shaft. This makes it difficult to design the shaft with sufficient strength to deal with a shorted generator which can triple the normal torque on the shaft. Also, a long low pressure shaft of relatively small diameter is likely to have critical frequency problems. More than two bearings are therefore usually required.

In conventional engines the low pressure shaft thrust bearing usually is at the compressor end because axial clearances are more critical between the compressor vanes and blades than those of the turbine. The location of the thrust bearing near the compressor limits the differential expansion between the stator and the rotors. The connected generator usually is at the turbine end with the starter equipment at the cold end. Therefore, there is significant low pressure shaft growth toward the coupling to the generator.

The turbine stator is fixed at the end near the generator to minimize the differential expansion between the generator and the gas turbine engine. In the conventional engine this is the turbine end. Therefore, the growth of the low pressure shaft is opposite that of the stator causing large differential axial growth between the stator vanes and the rotor blades.

Also, the coupling to the generator which is located at the turbine end is subject to the high temperatures within the turbine exhaust diffuser tunnel.

SUMMARY OF THE INVENTION

An integrated gasifier humid air turbine cycle as illustrated in U.S. Pat. No. 4,829,763 uses an intercooler between the low pressure and high pressure compressors, and a saturater and recuperater between the high pressure compressor and the combustor supplying the high pressure turbine. Conventional fully axial flow of the fluid through the turbine in the conventional manner is not required.

Accordingly, a low pressure compressor rotor and a low pressure turbine rotor are located on a low pressure shaft adjacent one another, with the generator secured to this low pressure shaft adjacent the outboard compressor. The high pressure compressor rotor and high pressure turbine rotor are secured to a high pressure turbine rotor shaft at a high pressure shaft end of the turbine engine. Each shaft extends only to an inboard axially central point of the gas turbine engine.

The low pressure shaft has a thrust bearing and a journal bearing at the outboard or generator coupling end, and a journal bearing at inboard end or central point. The high pressure shaft has a thrust absorbing ball bearing at the outboard end and a roller bearing at the inboard end or central point. This roller bearing may be located within the low pressure shaft in a "piggyback" arrangement.

The casing surrounding the high pressure compressor and the combustor is not split axially. The high pressure discharge volute and the remainder of the gas turbine engine casing is horizontally split, thereby facilitating maintenance.

BRIEF DESCRIPTION OF THE DRAWINGS

FIG. 3 is a view of the central bearing area.

DESCRIPTION OF THE PREFERRED EMBODIMENT

Figure 1:
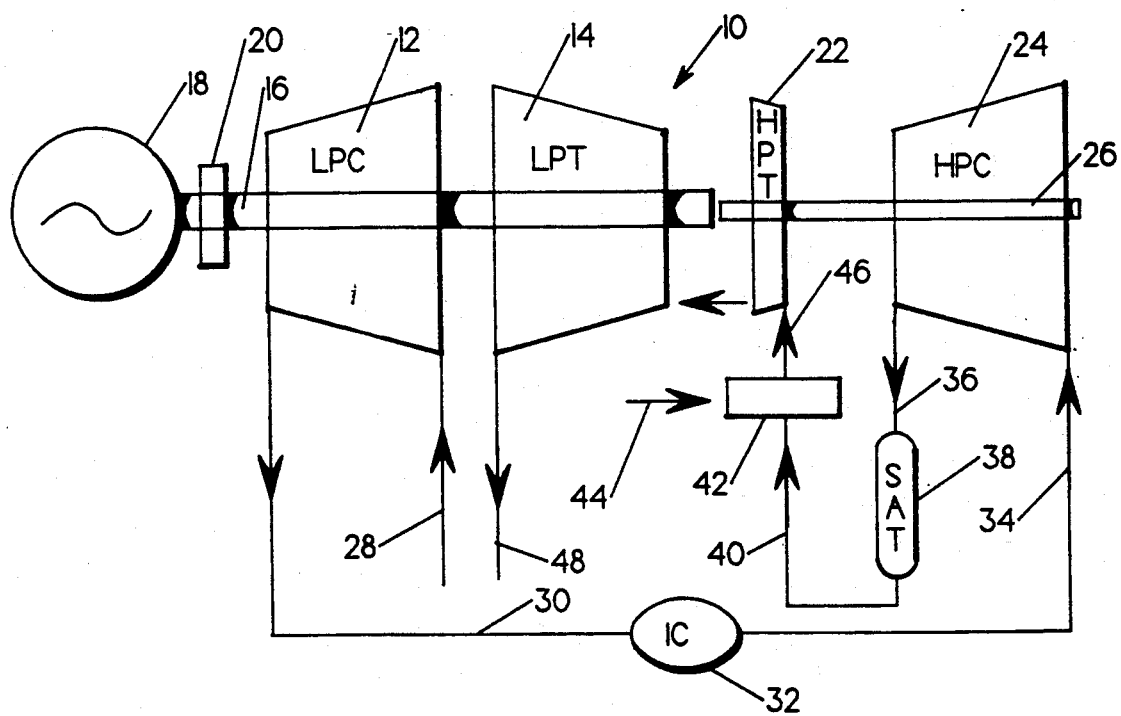
FIG. 1 is a schematic of the turbine and compressor arrangement.

Referring to FIG. 1, the gas turbine engine 10 includes a lower pressure compressor 12 and a low pressure turbine 14 with the rotors secured to a low pressure shaft 16. A power generator in the form of electric generator 18 is secured to the same shaft through coupling 20.

A high pressure turbine 22 and a high pressure compressor 24 have rotors secured to high pressure shaft 26. This high pressure shaft is rotatable independent of the low pressure shaft 16.

Air through line 28 enters the low pressure compressor passing outwardly through line 30 through intercooler 32. At reduced temperature the air passes to high pressure compressor 24 through line 34 with the high pressure air passing out through line 36 to saturater 38. The saturated high pressure air passes through line 40 to combustor 42 in which fuel 44 is burned. Through line 46 it then passes through a single stage high pressure turbine 22 and then through low pressure turbine 14 exhausting through line 48.

Figure 2:
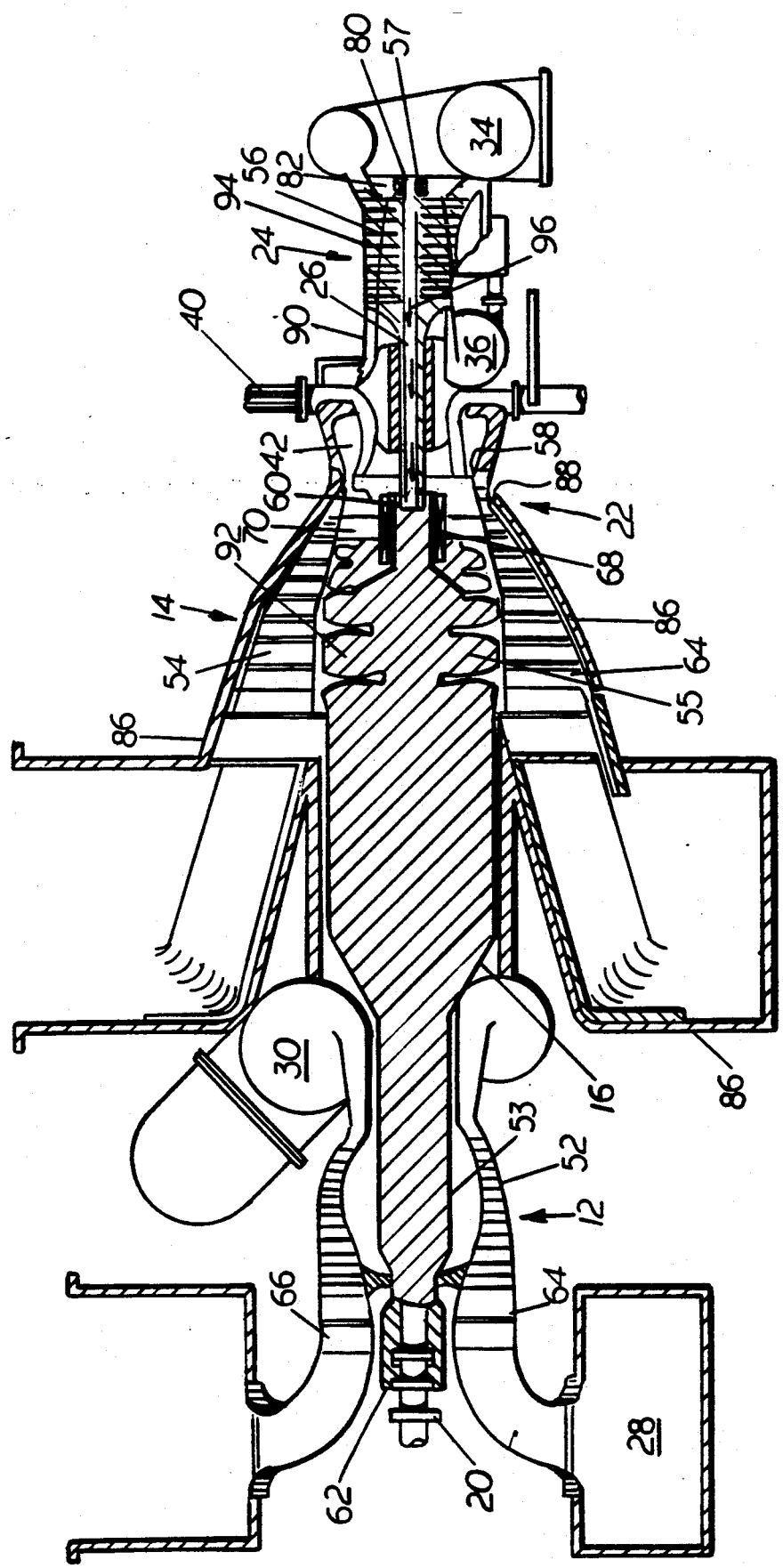
FIG. 2 is a top sectional view of the gas turbine engine.

Referring to FIG. 2, low pressure compressor rotor 52 of low pressure compressor 12 is secured at the outboard end 53 of the low pressure shaft 16. The low pressure turbine rotor 54 of low pressure turbine 14 is secured to the inboard end 55 of the low pressure shaft 16.

High pressure shaft 26 has the high pressure compressor rotor 56 of the high pressure compressor 24 secured to the outboard end 57 thereof. The inboard end 60 of this shaft has a single stage high pressure turbine rotor 58 of high pressure turbine 22 secured thereto. The inboard end 60 of the high pressure shaft 26 is conveniently extended within inboard end 55 of low pressure shaft 16 as described later with respect to FIG. 3.

A first bearing 62 comprising a journal and thrust bearing is located between the static structure 64 and the low pressure shaft 16 at the outboard end thereof. This bearing is supported on support struts 66. The fixed point of the casing is also located at this end.

A second bearing 68 comprising a journal bearing between static structure 64 and the low pressure shaft 16 is located at the inboard end of the shaft. This bearing is supported on struts 70, best seen in FIG. 3, passing through the gas flow path.

A third bearing 72 is a roller bearing between the inboard end 60 of the high pressure shaft and the inboard end 55 of the low pressure shaft. A common bearing housing 78 encases both of these bearings and serves as a mutual support with the structure being supported through the struts 70.

A fourth bearing 80 in the form of a ball and thrust bearing is located at the outboard end of the high pressure shaft 26. This is supported by struts 82 from the static structure 64.

All of the casing surrounding the low pressure rotor area is horizontally split at flange 86 allowing convenient low pressure rotor removal for repair. This flange extends back to the circumferential flange 88 between the high pressure turbine casing and the combustor casing. The high pressure compressor discharge volute 90 is also horizontally split. The casing surrounding the combustor and the high pressure combustor is not split.

The high pressure portion of the engine is assembled axially permitting the use of a current aircraft engine high pressure compressor. Access and disassembly of the annular combustor is also easily accomplished. After removing the split case 90 surrounding the discharge volute, the annular combustor casing may be moved aft, thereby exposing the combustor for inspection or maintenance.

The aft stage disks 92 of the low pressure turbine need cooling air. With this arrangement this may be accomplished by extracting air at location 94 from the high pressure compressor and passing it into the bore of the high pressure rotor. This cooling air may flow as cooling air 96 through the bore of the high pressure shaft into the bore of the low pressure shaft at the location of bearing 68. From this point the cooling air may pass to the stages 92 requiring cooling.

The common bearing housing at the central location requires only a single support for the whole central bearing package. Accordingly, only a total of three bearing housings are required to be supported for the gas turbine engine. The large diameter relatively short low pressure shaft may be supported with only two bearings without incurring critical frequency problems. It may also be easily designed strong enough to tolerate the high torque which would occur in the event of a generator short. The large generator secured to the low pressure end of the turbine makes it inadvisable to design for axial disassembly of the gas turbine engine. The low pressure split casing allows low pressure removal without axial movement.

Both the low pressure thrust bearing and the fixed engine support are at a cold end, as is the coupling to the generator. The required starter drive is at the other cold end, there being no hot end. The stators and rotors grow in the same direction, minimizing the axial clearance required.

The required interruption in flow is best accomplished with a two shaft gas turbine. Further, it is mechanically preferable to have the shafts in series, rather than concentric.

We claim:

1. A gas turbine arrangement for a power system comprising:
    a low pressure shaft;
    a high pressure shaft;
    a low pressure compressor rotor on said low pressure shaft;
    a low pressure turbine rotor on said low pressure shaft;
    a high pressure compressor rotor on said high pressure shaft;
    a high pressure turbine rotor on said high pressure shaft;
    said low pressure shaft and said high pressure shaft axially aligned and longitudinally offset, establishing a low pressure shaft end and a high pressure shaft end;
    said low pressure compressor rotor and said low pressure turbine rotor on said low pressure shaft at the low pressure end;
    said high pressure compressor rotor and said high pressure turbine rotor on said high pressure shaft at said high pressure end;
    a power output unit connected to said low pressure shaft;
    said low pressure shaft and said high pressure shaft being independently rotatable;
    a first bearing comprising a journal and thrust bearing between static structure and said low pressure shaft at the outboard end of said low pressure shaft;
    a second bearing comprising a journal bearing between static structure and said low pressure shaft at the inboard end of said high pressure shaft;
    a third bearing comprising a roller bearing between the inboard end of said low pressure shaft and the inboard end of said high pressure shaft; and
    a fourth bearing comprising a ball and thrust bearing between static structure and the outboard end of said high pressure shaft.

2. A gas turbine arrangement as in claim 1:
    a common bearing housing enclosing said second and third bearings.

* * * * *